United States Patent
Werthmann

Patent Number: 5,183,551
Date of Patent: Feb. 2, 1993

[54] METHOD FOR MAKING A CONTINOUS METAL BAND HAVING SURFACE IMPRESSIONS

[75] Inventor: Wilfried Werthmann, Krefeld-Fischeln, Netherlands

[73] Assignee: Standex International GmbH, Krefeld, Fed. Rep. of Germany

[21] Appl. No.: 466,442

[22] PCT Filed: Feb. 22, 1989

[86] PCT No.: PCT/EP89/00176
§ 371 Date: May 16, 1990
§ 102(e) Date: May 16, 1990

[87] PCT Pub. No.: WO90/09865
PCT Pub. Date: Sep. 7, 1990

[51] Int. Cl.$^5$ .............. C25D 1/10; B23P 15/24
[52] U.S. Cl. ........................... 205/70; 205/67; 205/76
[58] Field of Search ............ 204/3, 4, 5, 6, 12; 205/67, 68, 70, 76

[56] References Cited

U.S. PATENT DOCUMENTS

| | | | |
|---|---|---|---|
| 3,532,587 | 10/1970 | Ungar et al. | 161/120 |
| 4,478,769 | 10/1984 | Pricone et al. | 264/1.6 |
| 4,537,810 | 8/1985 | Held | 428/156 |

Primary Examiner—John Niebling
Assistant Examiner—William T. Leader
Attorney, Agent, or Firm—Townsend and Townsend

[57] ABSTRACT

A working duplicate of an endless master band having a pattern impressed on its surface for use in the production of laminated boards is produced by first making a polyurethane cast of the impressed pattern in the form of an endless, flexible plastic band. A metal layer is galvanically deposited over the pattern on the plastic band to form a galvanic band which functions as a working duplicate after the plastic band has been peeled off. The resultant galvanic band is an exact duplicate of the original master band and is utilized in a press for impressing the pattern on the surface of laminated boards.

7 Claims, 1 Drawing Sheet

METHOD FOR MAKING A CONTINOUS METAL BAND HAVING SURFACE IMPRESSIONS

The invention relates to a method for making an endless metal band having a pattern, or three-dimensional surface impressions for use in the continuous production of pressed laminated sheets or boards.

Pressed laminated sheets, such as plastic-coated hard fiber boards, fiberglass boards or the like used in the manufacture of furniture or room interiors have a variety of design patterns impressed in their outer surface. Such designs include e.g. intricate patterning, corrugations, knubs as well as wood grain textures. The pattern is impressed into the board surfaces with presses. In a known press disclosed in EP-B1-31 613 the laminated boards are continuously form-pressed between two endless bands. The unfinished board is pressed between two endless bands which move in opposite directions of rotation. One of the endless bands has a pattern impressed into its surface which faces the laminated board. Such a band comprises an endless stainless steel carrier band that is coated with a thin metal layer into which the pattern has been etched. However, manufacturing such an endless band by welding its ends together, smoothing the weld seams and coating the surface with a layer of non-ferric metal into which the pattern is etched is very costly. Endless bands of this type may have a length of up to 30 m.

To generate such a pattern it is conventional to first grind and polish the metal layer and then apply to it a masking compound. The compound may be applied in accordance with a variety of suitable methods. These include applying the compound with rolls, or pressure cylinders (filter rolls, offset rolls) which carry the desired pattern. Alternatively, photographic reproduction processes can be employed in which the metal is coated with a photosensitive material and then exposed light through a superimposed negative of the desired pattern. Unexposed portions of the photographic layer which correspond to the desired pattern remain after development of the photosensitive layer. This procedure can be repeated one or more times with identical or differing masks to obtain impressions of varying depths on the endless band. Given their limited durability and the not infrequent damage to the bands, it is necessary to produce or refurbish several endless bands having the same pattern. When producing a plurality of identical endless bands it has heretofore been necessary to employ the above described method for each of them. Such a multi-step operation, however, is tedious and very expensive.

It is therefore an object of the present invention to develop an economically more efficient method for producing one or more endless bands having identical surface patterns. The object is achieved with the present invention in that a cast in the form of an endless, resilient plastic band is made from the surface pattern of a first endless band. A thin metal layer is galvanically applied to the patterned surface of the plastic band to produce a working duplicate in the form of an endless galvanic metal band. In a final step the plastic band is separated from the galvanic metal band.

The present invention makes it possible to produce from a conventionally manufactured metal band having the desired surface pattern a multiplicity of endless duplicates which have the identical surface patterns. The conventionally manufactured original band serves as a master band or die from which the working duplicates for the continuous production of laminated boards are produced. Such a duplicating process for large bands is simpler, more efficient and substantially more economical than the conventional etching process. The working duplicates require no stainless steel carrier band, thus eliminating the need for the costly manufacture of endless bands by welding its ends together and then smoothing the weld. By contrast the galvanic band of the present invention is rigid enough to withstand the mechanical stresses imposed on it by the press; moreover a cast for a flexible, continuous plastic band is simple and inexpensive to manufacture. A plastic cast replicates the multi-layered pattern down to the finest detail so that the original surface pattern is precisely repeated on the surface of the metal layer which is galvanically applied to the plastic band. Upon separation of the galvanic metal band, another metal layer can be galvanically applied to the plastic band which, therefore, functions as a master die. Finally, such a plastic band-negative is much easier to store than a conventional, surface patterned steel band.

The plastic band is produced by preferably applying a polyurethane compound over the surface pattern of the endless metal band which undergoes polymerization. A precise casting is obtained with the polyurethane compound and its elastic properties facilitate its separation from the master band as well as from the galvanic metal band. Other suitable plastic materials, such as polyvinylchloride, silicon rubber or the like, may be substituted for the polyurethane compound. To enhance the mechanical strength and rigidity of the endless plastic band which, like the master die, may extend up to 30 m in length and 2.5 m in width, reinforcing fibers or a netted fabric can be imbedded in the plastic material.

Prior to the electrolytic deposition of the metal layer it is necessary to apply a conductive coating to the surface pattern of the non-conductive plastic band, e.g. by spraying the surface with a silver-containing solution, followed by a solution containing a reducing agent. The plastic band coated with the silver precipitate is then immersed in a galvanic bath to deposit a metal layer over the pattern on the plastic band of about 1-3 mm in thickness and comprised of a nonferrous metal, such as copper, nickel or brass.

After a galvanic metal band produced through electrolytic deposition has been separated from the plastic band it is polished by electrolytic or mechanical means. The inner surfaces which are engaged by the rolls of the press are ground.

The master band preferably has a negative of the pattern to be pressed into the surface of the laminate board. In this case a positive of the pattern is cast on the inner surface of the plastic band. In turn, the outer surface of the metal galvanically formed on the inner surface of the plastic band, i.e. the galvanic band, again forms a negative of the desired pattern. In this state the galvanic band is ready for use in a continuously operating press. Conversely, if the surface of the master band carries a positive pattern, the galvanic band must be inverted after it has been separated from the plastic band. In this case the plastic band carries the negative of the pattern and the outer surface of the resultant galvanic band has a positive pattern. Provided the galvanically applied metal layer is sufficiently thin, the negative of the pattern appears on the inner surface of the galvanic band. By inverting the galvanic band the negative pattern then faces outwardly. The galvanic band can be easily inverted since its length ranges from 5 m to 30 m. Once inverted, the outward facing surface of the band forms a negative of the pattern, whereupon the galvanic band is operational.

Some embodiments of the present invention will now be described, by way of example, with reference to the accompanying drawings, in which.

Figure 1:
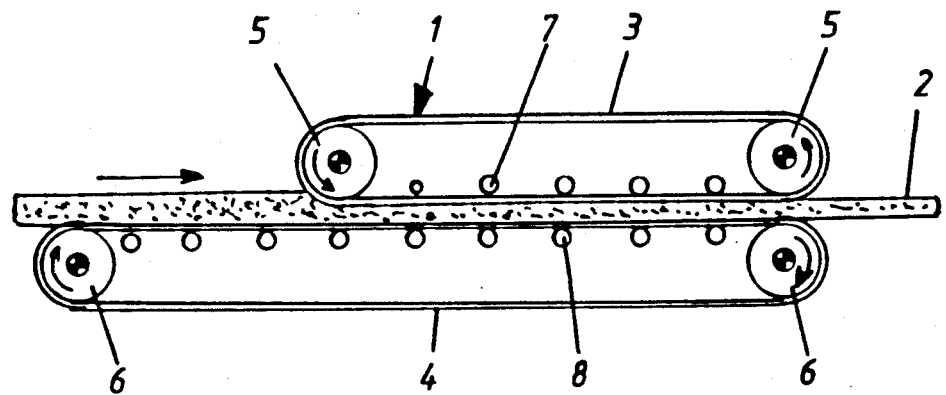
FIG. 1 is a schematic representation of a press for continuously producing pressed boards with a surface patterned band.

FIG. 1 is a schematic representation of a press 1 for continuously producing laminated boards 2. It comprises essentially two endless bands 3, 4 driven synchronously by a motor which rotates two rollers 5 and 6. Rollers 7 and 8 are provided for supporting the bands. An unfinished workpiece, e.g. plastic-impregnated wood, glass fiber material or the like, which may also carry a hard, protective plastic layer, is fed into the open end of lower band 4 and shaped into a laminated board 2 between the two oppositely rotating endless bands. The surface of upper band 3 has a pattern which is pressed into the surface of laminated board 2 as the latter undergoes the finishing and surface treatment phase.

Interchangeable, endless metal band 3 used in press 1, is manufactured by duplicating a master band as follows:

Initially a endless metal band 3 is produced in accordance with the method known from EP-B1-31 631. An endless metal band is made from a metal sheet, which is capable of being welded and electroplated, e.g. stainless steel, by welding its ends together. The band is then electroplated with a metal such as brass, which is well suited for electroplating and etching. Once the electroplated layer is smoothed and polished a pattern is worked into its surface, preferably by means of an etching process. For example, a pressure roller which has the desired pattern on its surface is used to apply a masking compound onto the surface of the endless band. This is achieved by simply rolling the endless band against the pressure roller or vice versa. After the masking compound has been applied, the band is etched. Those surfaces of the plating which have no masking compound are eroded to form recesses that replicate an engraving of the desired pattern. Following the initial etching and the removal of the masking compound the "engraved" surface may undergo one or more such treatments in which, for example, the masking compound is applied in differing configurations or in the same configuration but off-set. The results are multi-tiered surface etchings in which e.g. additional recesses can be etched into the surface of a first recess. Once the desired pattern has been formed the endless band is conventionally chrome-plated and ready for use.

Pressed laminate sheets having a particular impressed surface pattern are generally mass produced such that a worn or damaged continuous band 3 must be replaced with a new band having precisely the same surface pattern. The continuous band 3 of the present invention, produced in accordance with the aforementioned method, serves as a master for making working duplicates to be used in press 1.

Figure 2:
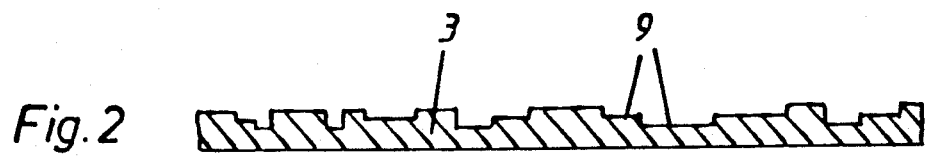
FIG. 2 is a cross-section of the surface patterned band shown in FIG. 1.
Figure 3:
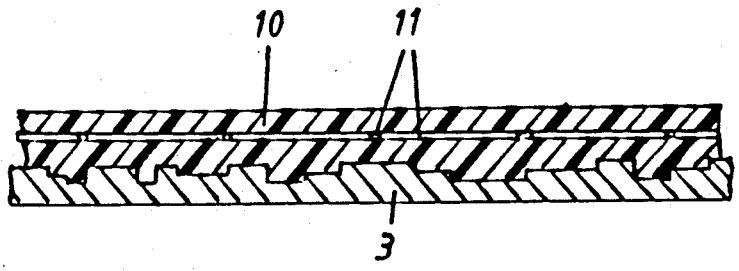
FIG. 3 is a cross-section of the surface patterned band over which a reinforced plastic layer has been applied.
Figure 4:
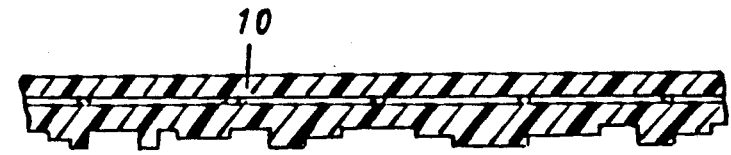
FIG. 4 is a cross-section of the reinforced plastic layer shown in FIG. 3 after it has been peeled off of the surface patterned band.
Figure 5:
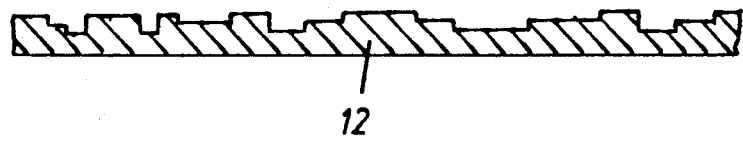
FIG. 5 is a cross-section of a metal band that is produced by electrolytically depositing a metal layer on the patterned surface of the plastic layer shown in FIG. 4.

A working duplicate is produced by applying a layer of polyurethane compound to an endless band 3 having the desired surface pattern, as schematically shown in FIG. 2. A reinforcing fabric 11 or fibers are imbedded in the polyurethane layer (cf. FIG. 3). If needed, a separating agent, e.g. a silicon solution can be sprayed on the pattern before the polyurethane compound is applied. The resultant 3–4 mm thick layer of polyurethane compound then undergoes polymerization to form an endless, flexible plastic band 10 which extends over the entire circumference of endless band 3. The flexible plastic band 10 is then peeled off endless band 3 and forms an intermediate product which includes a replica of the pattern.

Since plastic band 10 is made of a non-conductive material, an electrically conductive coating is first applied to the surface of the band which carries the pattern to enable the electrolytic deposit of a metal layer thereon. This can be effected by spraying a silver salt solution and a reducing agent onto it to form a thin silver coating over the pattern. Thereafter the plastic band with the conductive surface produced in the above described manner is immersed in a conventional galvanic bath holding a nonferrous metal, for example, copper, nickel or an alloy, e.g. brass. A thin metal layer precipitates on the electrically conductive surface of plastic band 10 having a thickness of anywhere from 0.5 to 3 mm, depending upon the band dimensions and related factors. The resultant metal layer forms a galvanic metal band 12 from which plastic band 10 is peeled off.

Finally, the back side of the galvanic band is polished and, where necessary, lined with a fiber-reinforced plastic or plastic coated foil. The surface exhibiting the pattern is electrolytically or mechanically smoothed and chrome-plated. Once the galvanic band 12 is finished it is ready for installation as a working duplicate in a press. The peeled off plastic band 10 can then be used to produce another galvanic band 12.

I claim:

1. A method for making an endless metallic band having a pattern for the continuous production of laminated boards, comprising the steps of providing a first endless band having the pattern on the surface thereof casting an endless, plastic band over the surface of the first endless band having the pattern so that the plastic band has a corresponding pattern on a surface thereof, rendering the surface of the plastic band which carries the pattern electrically conductive, electrolytically depositing a metal layer over the pattern on the surface of the plastic band to thereby form a working copy of the plastic band, and removing the plastic band from the working copy so that the working copy constitutes a duplicate of the first endless band.

2. A method according to claim 1, characterized in that the step of casting comprises the step of applying a polyurethane material to the surface of the first endless band having the pattern, and polymerizing the material to form the elastic plastic band.

3. A method according to claim 1, characterized by the step of embedding reinforcement fibers or a reinforcement fabric in the plastic band.

4. A method according to claim 1, characterized in that the step of rendering comprises applying an electrically conductive layer to the surface of the plastic band carrying the pattern.

5. A method according to one of claim 1, characterized by grinding the working copy on its inner surface and electrolytically or mechanically polishing the pattern on the surface of the galvanic band.

6. A method according to one of claim 1, characterized by forming a negative pattern in the endless first band which serves as a master die.

7. A method according to one of claim 1, characterized by forming a positive pattern in the first endless band which serves as a master die, and by inverting the working copy after the removal of the plastic band therefrom.

* * * * *

UNITED STATES PATENT AND TRADEMARK OFFICE
CERTIFICATE OF CORRECTION

PATENT NO. : 5,183,551
DATED : February 2, 1993
INVENTOR(S) : Wilfried Werthmann It is certified that error appears in the above-indentified patent and that said Letters Patent is hereby corrected as shown below:

Cover Page, Item [75] Inventor: delete "Netherlands" and substitute therefor -- Germany --.

Signed and Sealed this

Eighteenth Day of January, 1994

Attest:

BRUCE LEHMAN

Attesting Officer     Commissioner of Patents and Trademarks